Aug. 8, 1961  H. B. DENNIS ET AL  2,995,357
WORKPIECE HOLDER
Filed June 9, 1958
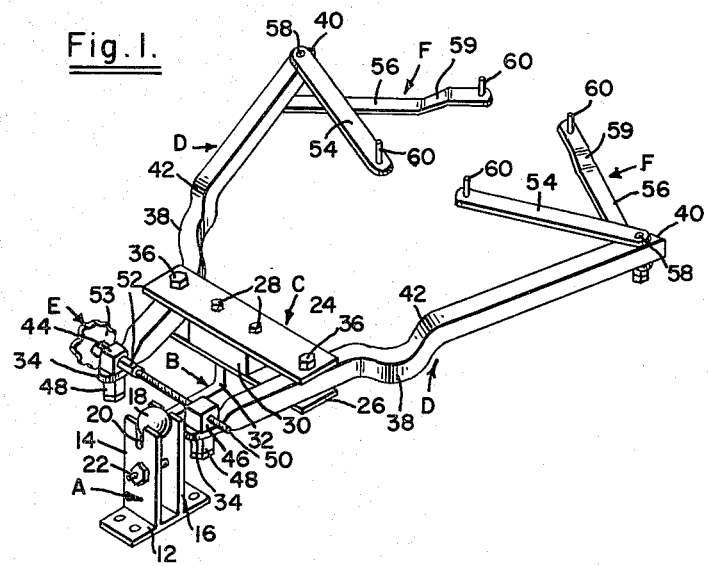
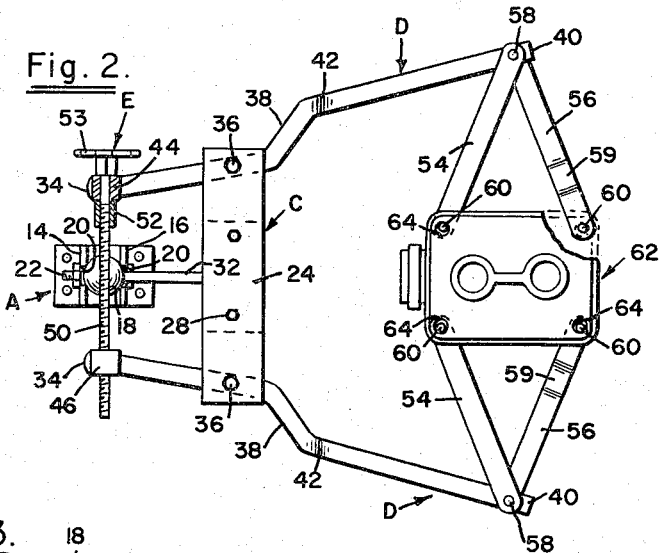
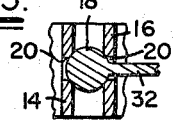
INVENTORS
Hardy B. Dennis
Robert M. Dennis
BY
Townsend and Townsend
Attorneys

United States Patent Office 2,995,357
Patented Aug. 8, 1961

2,995,357
WORKPIECE HOLDER
Hardy B. Dennis and Robert M. Dennis, both of 1019 Tyler St., Fairfield, Calif.
Filed June 9, 1958, Ser. No. 740,635
3 Claims. (Cl. 269—134)

This invention relates to new and useful improvements in workpiece holders and provides a device easily adjustable to receive and securely hold carburetors, valve bodies and the like.

It is the object of this invention to provide a device of simple construction and operation to facilitate repair and work on carburetors, valve bodies and the like.

A particular object and feature of the invention is to provide a device manually adjustable to receive and hold carburetors or other objects of a variety of shapes and sizes. Specifically the device described is adjustable to receive and hold all known sizes of automobile carburetors.

Another object and feature resides in the universal movement afforded whereby the object to be worked on may be held in any desired position.

The device is of simple construction lending itself both to economy of manufacture and simplicity of use.

Other objects of the present invention will become apparent upon reading the following specification and referring to the accompanying drawings in which similar characters of reference represent corresponding parts in each of the several views.

In the drawings:

FIG. 1 is a perspective view of a preferred embodiment of the invention;

FIG. 2 is a plan view thereof, partly broken away, and schematically illustrating a carburetor supported by the invention; and FIG. 3 is a fragmentary cross-section showing certain details.

The drawings illustrate a base A, a stem B which is connected to the base for substantially universal movement, and a bracket C connecting a pair of arms D for movement relatively toward and away from each other. A threaded rod E connecting the arms at one end provides a means for effecting the movement relatively toward and away from each other of the arms, and a pair of links F are pivoted to the other end of each arm for relatively co-planar movement of the legs.

Base A is suitably secured at its bottom to a table, bulkhead or other permanent fixture and comprises a bottom or mounting member 12 and a pair of up-standing legs 14 and 16.

Stem B has been illustrated as a round iron member terminating in a ball 18 which mounts the stem for substantially universal movement relative to base A. Legs 14 and 16 have been cut out or bifurcated as at 20, and, as particularly appears in FIG. 3, legs 14 and 16 have been concaved adjacent bifurcations 20 to provide a snug fit for ball 18. Bifurcations 20 in conjunction with the spacing between legs 14 and 16 permit partially universal or hemispherical movement of stem B relative to base A.

Tightening of legs 14 and 16 about ball 18 is effected and maintained by nut and bolt 22 which passes through apertures in legs 14 and 16.

Bracket or bonnet C has been illustrated as two metal plates 24 and 26 secured together as by bolts 28. A spacing member 30 centrally positioned between plates 24 and 26 spaces the plates parallel to each other.

Stem B has been bent at 90° as at 32 and bracket C is secured to the bent or deformed end of the stem as by welding.

Arms D may be formed of metal stock and are pivoted proximate a first or forward end 34 as by bolts 36 which mount an arm at each end of bracket C. Bolts 36 permit substantially co-planar movement of arms D.

Arms D have been illustrated as deformed outwardly as at 38 to provide additional spacing between the second or rearwardly disposed ends 40 of the arms. The arms have also been illustrated as deformed upwardly as at 42 whereby bracket C does not interfere with the object held as will hereinafter appear.

The forward ends 34 of arms D have been flattened and apertured to receive bolts 44 and 46 which are secured to ends 34 as by nuts 48. Nuts 48 mount bolts 44 and 46 loosely on the arms whereby the bolts are slightly rotatable relative to the arms.

The screw means E for adjusting arms D has been illustrated as a threaded rod 50 passing through the illustrated square heads of bolts 44 and 46. Rod 50 is in threaded engagement with bolt 46 but not with bolt 44 (FIG. 2). A collar 52 mounted on rod 50 serves as a bearing on one side of bolt 44 maintaining it in a fixed relation on rod 50 and a knob 53 serves as a bearing from the other direction and also facilitates manual adjustment of the positioning of the arms. On rotation of the knob, rod 50 draws ends 34 of the arms toward or away from each other similar to a swivel type turnbuckle.

Two pairs of links which support the workpiece are indicated generally at F. Each pair comprises individual links 54 and 56 pivoted to the rearward end 40 of an arm as by nut and bolt 58. In the drawings links 54 have been pivoted from the upper surface and legs 56 from the lower surface of arms D, and links 56 have been turned upwardly as at 59 whereby the free ends of all links are movable in a single plane.

A pin 60 mounted at right angles to the free end of each link is operable to receive and hold the object to be worked on.

In use, knob 53 is manually rotated to space pins 60 to receive and hold the object to be worked upon.

FIG. 2 illustrates the invention supporting a carburetor 62. The carburetor is formed with customary bores or bolt holes 64 at each corner to support the carburetor. Knob 53 is manually rotated to space arms D whereby links F may be adjusted so that each pin 60 is received in a bore 64 of carburetor 62. Slight additional spacing of arms D by turning knob 53 to further space arms D effects a tension lock of the carburetor causing it to be tightly held, and whereby the arms may be moved as a unit relative to base A without dropping the carburetor.

The arms and associated parts are then moved relative to base A to position the carburetor in a vertical, horizontal or other position desired.

To remove the carburetor from the workpiece holder knob 53 is rotated in the opposite direction to release tension between pins 60 and bores 64 and the carburetor may be removed.

Valve bodies and other objects may be similarly held by the workpiece holder to facilitate work on the object held.

The adjustability of the arms and links renders the invention adaptable to carburetors and other objects of a variety of sizes and shapes. The upward turning of the arms as at 42 spaces the object held from bracket C so the object can extend over the bracket and the bracket does not constitute a limitation on the size of the objects to be worked on.

The invention is of simple construction and operation and provides a device whereby objects to be worked on of a wide variety of shapes and sizes may be effectively held and locked on the workpiece holder in substantially any desired position to facilitate work on the object.

Although the foregoing invention has been described

What is claimed is:

1. In a workpiece holder of the type adapted to support a variety of workpieces each of which has approximately four apertures disposed in a substantially rectangular pattern and in which various workpieces have different aperture spacing comprising a pair of arms, a bracket pivotally supporting each of said arms, a pair of links pivotally mounted on one end portion of each of said arms, and workpiece aperture receiving means mounted on the outer ends of each of said links, each pair of links being pivotally movable to position their said aperture receiving means in registration with a pair of apertures of a preselected workpiece, said arms being movable to a position to allow for the simultaneous registration of the aperture receiving means of each pair of links with apertures of the preselected workpiece.

2. A device according to claim 1 having a primary support, and means pivotally connecting said primary support to said bracket to allow said holder to be rotated about a horizontal axis.

3. In a workpiece holder of the type adapted to support a variety of workpieces each of which has approximately four apertures disposed in a substantially rectangular pattern and in which various workpieces have different aperture spacing comprising a pair of arms each having a first end portion and a second end portion, a bracket pivotally supporting each of said arms at a position intermediate the first and second end portions and in relatively spaced apart relation, a pair of links pivotally mounted on the first end portion of each of said arms, workpiece aperture receiving means mounted on the outer ends of each of said links, said links being pivotally movable to position said aperture receiving means in registration with a pair of apertures of a preselected workpiece, and means mounted on the second end of said arms to move said arms to a position to allow for the simultaneous registration of the aperture engaging means on each pair of links with the apertures of the preselected workpiece.

References Cited in the file of this patent

UNITED STATES PATENTS

| | | |
|---|---|---|
| 442,733 | Shampel | Dec. 16, 1890 |
| 2,568,508 | Montague | Sept. 18, 1951 |
| 2,669,958 | Sweeny | Feb. 23, 1954 |
| 2,824,536 | Gamble | Feb. 25, 1958 |